United States Patent [19]
Friedel

[11] 3,922,732
[45] Dec. 2, 1975

[54] METHOD OF AND SYSTEM FOR HEATING SWIMMING POOLS

[76] Inventor: Wolfgang Friedel, Danziger Strasse 2, 6944 Hemsbach am der Bergstrasse, Germany

[22] Filed: May 13, 1974

[21] Appl. No.: 469,303

[30] Foreign Application Priority Data
May 12, 1973 Germany............................ 2324208

[52] U.S. Cl. .................................................. 4/172
[51] Int. Cl.² ......................................... E04H 3/16
[58] Field of Search............. 4/172, 172.12, 172.13, 4/172.14, 172.19

[56] References Cited
UNITED STATES PATENTS
2,979,733 4/1961 Saint Clair et al...................... 4/172
3,456,265 7/1969 Carnahan............................... 4/172

*Primary Examiner*—Robert I. Smith
*Attorney, Agent, or Firm*—Karl F. Ross; Herbert Dubno

[57] ABSTRACT

Within a large body of water, such as a lake, an area to be used as a swimming pool is confined by a floating heat barrier reaching down from the water surface to a depth of a few meters but terminating above the lake bottom. A heat pump abstracts heat from the water in a region beyond the pool area and raises the temperature of water circulating through it from that area. Only a narrow access, which may be thermally insulated against the water, connects the swimming pool with the land in order to minimize heat losses.

10 Claims, 3 Drawing Figures

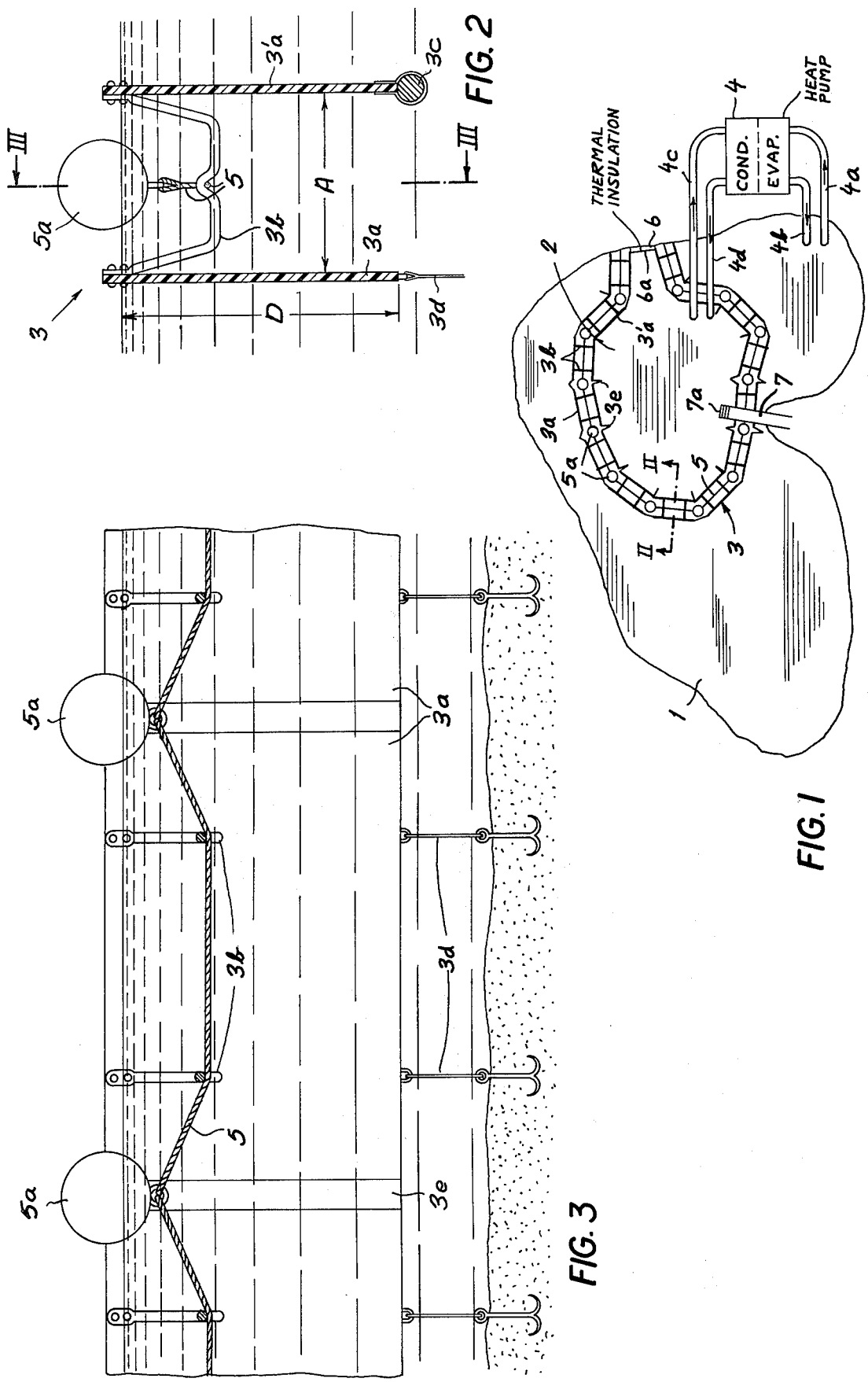

METHOD OF AND SYSTEM FOR HEATING SWIMMING POOLS

FIELD OF THE INVENTION

My present invention relates to swimming pools and, more particularly, to the heating of such a pool in a colder environment.

BACKGROUND OF THE INVENTION

In order to extend the availability of outdoor swimming pools beyond the summer season, it has already been proposed to provide a heat pump for maintaining the water temperature at a suitable level. Such a heat pump, divided into a compressor section and an evaporator section, requires a large volume of fluid serving as a heat reservoir. This fluid must be circulated through the evaporator section in order to give off heat to an expanded and therefore cooled working medium which thereafter, in the compressor section of the pump, releases that heat to a circulating flow of water from the swimming pool.

The most obvious heat reservoir for such a pump is ambient air, yet the low heat-transfer coefficient of air makes such an operation uneconomical. Water, which is more advantageous in this respect, is not always available in sufficient quantities apart from the swimming pool to be heated.

OBJECTS OF THE INVENTION

The general object of my present invention is to provide a method of and means for establishing a heated swimming pool in an environment in which only a single body of water is available.

A more particular object is to utilize, in such a system, the inherent low operating cost and virtually pollution-free action of a heat pump.

SUMMARY OF THE INVENTION

In accordance with the present invention, these objects can be realized by thermally insulating a limited volume of water within a larger body, such as a lake, a pond or an ocean, against the surrounding water along a substantially closed boundary and circulating water from outside the boundary in a first flow through the evaporator section of a heat pump while simultaneously circulating water from within the boundary in in a second flow through the condenser section thereof. Heat is thus continuously abstracted from the first flow and delivered to the second flow by the carrier fluid of the heat pump.

Since the warmer water heated by the pump rises to the top of the water volume within the confined area, no thermal barrier need be provided at the bottom of the swimming pool so defined. This pool, theofore, requires only a peripheral heat barrier which advantageously, pursuant to a further feature of my invention, is floatingly supported and extends from above into the water to a depth sufficient for swimming and possibly diving, generally on the order of several meters. With a swimming pool installed in this way within a deeper lake, pond or lagune, the barrier may terminate well above the bottom of that body of water so as to delimit a downwardly open enclave.

According to a more particular feature of my invention, the heat barrier comprises a plurality of generally vertical shields of thermally insulating material; these shields need not have any inherent buoyancy but may be harnessed to floating members or buoys spaced apart along the pool boundary. The shields may have the form of solid sheets or plates, e.g. of polyethylene, though they could also consist of cellular material such as foam polystyrene. Plates or boards in the form of fibrous mats, made from mineral or glass filaments of low thermal conductivity, are also suitable; they may be coated with a water-impermeable layer of polyethylene or the like.

Since a stationary body of water is a good heat insulator, even relatively thin foils can be used if they are disposed in substantially parallel, transversely spaced pairs impeding heat transfer by convection. The shields may be anchored to the bottom and/or suitably weighted to maintain a substantially vertical attitude.

According to another feature of my invention, serving for the further reduction of heat losses from the pool area, this area is separated by water from surrounding land along the entire length of its boundary except for a limited access path. Since the soil is a relatively good conductor of heat, I prefer to shield even that limited access path from the heated water of the pool by thermal insulation.

BRIEF DESCRIPTION OF THE DRAWING

The above and other features of my invention will now be described in detail with reference to the accompanying drawing in which:

FIG. 1 is a top plan view of a pool or lake provided with a swimming-pool installation according to my invention;

FIG. 2 is a cross-sectional detail view taken on the line II — II of FIG. 1 but drawn to a larger scale; and FIG. 3 is a sectional elevation taken on the line III — III of FIG. 2.

SPECIFIC DESCRIPTION

In FIG. 1 I have shown a body of water 1 within which a limited area 2 is marked off as a swimming pool by a substantially closed heat barrier 3. A heat pump 4 has an evaporator section and a condensor section, the former being traversed by a flow of water from an outer region of lake 1 whereas the latter is traversed by a flow within pool area 2. Thus, an inlet end of a conduit 4a and an outlet end of a conduit 4b open into the lake externally of barrier 3 whereas an inlet end of a conduit 4c and an outlet end of a conduit 4d open into the lake within that barrier. It will be noted that area 2 is separated from land by surrounding water almost everywhere along its periphery, with the exception of a narrow landing 6 and a small bridge 7 giving access thereto. A strip 6a of thermal insulation (e.g. foam polystyrene), interposed between landing 6 and the water, minimizes the loss of heat at that point; the strip may be embedded in the soil or simply overlie same. Bridge 7 terminates in a stair 7a which descends into the water and may also be thermally insulated; this bridge could be replaced, if desired, by a diving board. Moreover, the pool area may be divided by suitable markings into a shallow zone for nonswimmers, close to shore, and a deeper zone for swimmers. In some instances, landing 6 could be eliminated with access given only by bridge 7 or possibly several such bridges.

As best seen in FIGS. 2 and 3, heat barrier 3 comprises pairs of transversely spaced vertical sheets or plates 3a, 3'a supported by a harness 3b, in the form of at least two substantially U-shaped brackets, on a continuous cable 5 held up by a series of spherical floats or buoys 5a. The outer plate 3a of each pair is anchored to the lake bottom at 3d whereas the inner plate 3'a has its lower edge weighted down by a horizontal bar 3c of iron, lead or other heavy metal, suitably protected against corrosion. Shield members 3a, 3'a descend to a depth D, substantially greater than their spacing A, of about 1.5 to 3 meters; they are interconnected by flexible strips 3e of similar material.

The illustrated arrangement stabilizes the heat barrier in a simple and effective manner, especially if the water level is substantially constant. With greater fluctuations it may be necessary to provide weighting bars 3c or the like on both sheets 3a, 3'a and to replace the substantially vertical anchor cables 3d by sloping guy wires fastened directly to cable 5.

I claim:

1. A method of providing a heated swimming pool in a colder environment, comprising the steps of thermally insulating a limited water volume within a larger body of water against the surrounding water along a substantially closed boundary terminating short of the bottom of said body of water to delimit a downwardly open enclosure, circulating a first flow from said surrounding water through a heat pump for abstracting heat therefrom, and circulating a second flow from said limited water volume through said heat pump for elevating the temperature thereof by the heat abstracted from said first flow, with direct contact between the heated water within said boundary and an underlying mass of colder water from said larger body.

2. A method as defined in claim 1 wherein said boundary is formed by a floating heat barrier extending from above into the water to a depth on the order of several meters.

3. An installation for providing a heated swimming pool in a limited area of a larger body of water, comprising:
 a heat barrier extending along a substantially closed boundary within said body of water but terminating at a distance from the bottom thereof to delimit a downwardly open enclosure;
 first conduit means having an inlet and an outlet communicating with said body of water outside said boundary;
 second conduit means having an inlet and an outlet communicating with a restricted water volume supported within said boundary on an underlying mass of water in direct communication with the surrounding body; and
 a heat pump connected to said first and second conduit means for abstracting heat from water circulating through said second conduit means and raising the temperature of water circulating through said first conduit means, thereby heating said water volume to a temperature higher than that of the underlying mass of water.

4. An installation as defined in claim 3 wherein said barrier comprises a plurality of generally vertical shields of thermally insulating material floatingly supported on said body of water and extending downwardly to a depth on the order of several meters.

5. An installation as defined in claim 4 wherein said shields are anchored to said bottom.

6. An installation as defined in claim 4 wherein said shields comprise pairs of substantially parallel, transversely spaced sheets provided with common floating support means.

7. An installation as defined in claim 6 wherein one of the sheets of each pair is anchored to said bottom, the other sheet of each pair having a weighted lower edge.

8. An installation as defined in claim 7 wherein said support means comprises a plurality of spaced-apart floats, a cable extending between said floats, and a harness riding on said cable.

9. An installation as defined in claim 3 wherein said area is separated by water from surrounding land along the entire length of said boundary except for a limited access path.

10. An installation as defined in claim 9, further comprising thermally insulating means interposed between the land and said area at said access path.

* * * * *